Dec. 13, 1966 J. H. MOSS 3,290,848
CEILING AND WALL TILE AND SUSPENSION SYSTEM FOR SAME
Filed Feb. 26, 1964 2 Sheets-Sheet 1
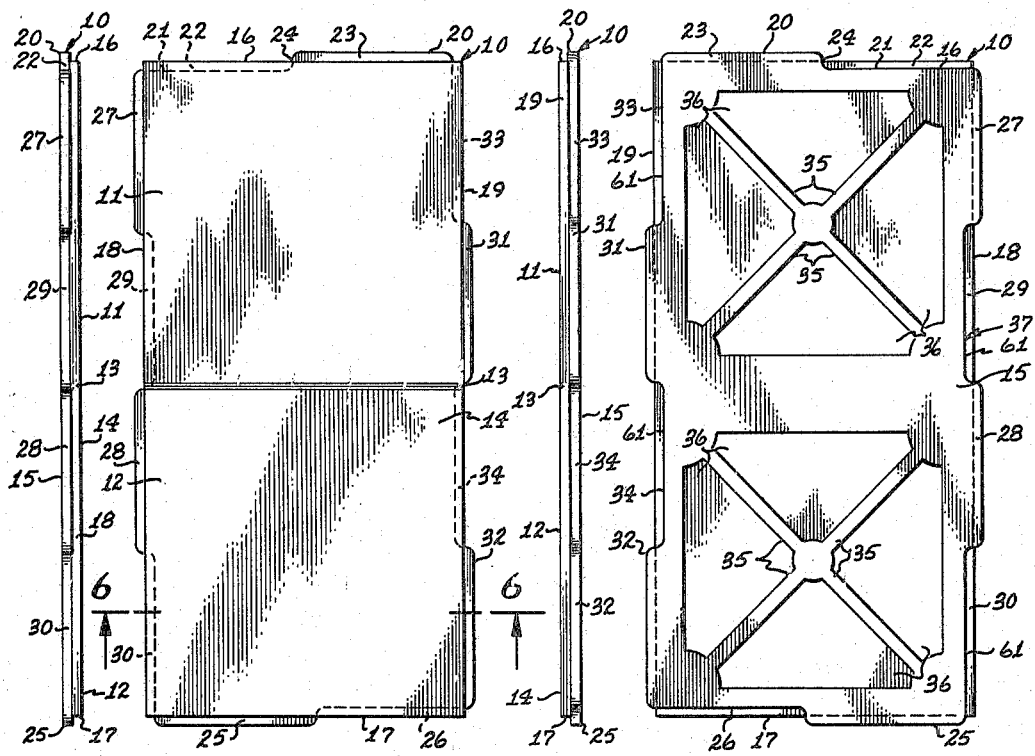
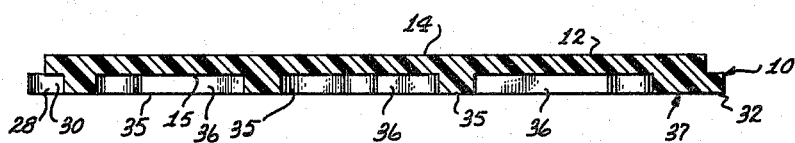
INVENTOR.
JOHN H. MOSS
BY
ATTORNEY

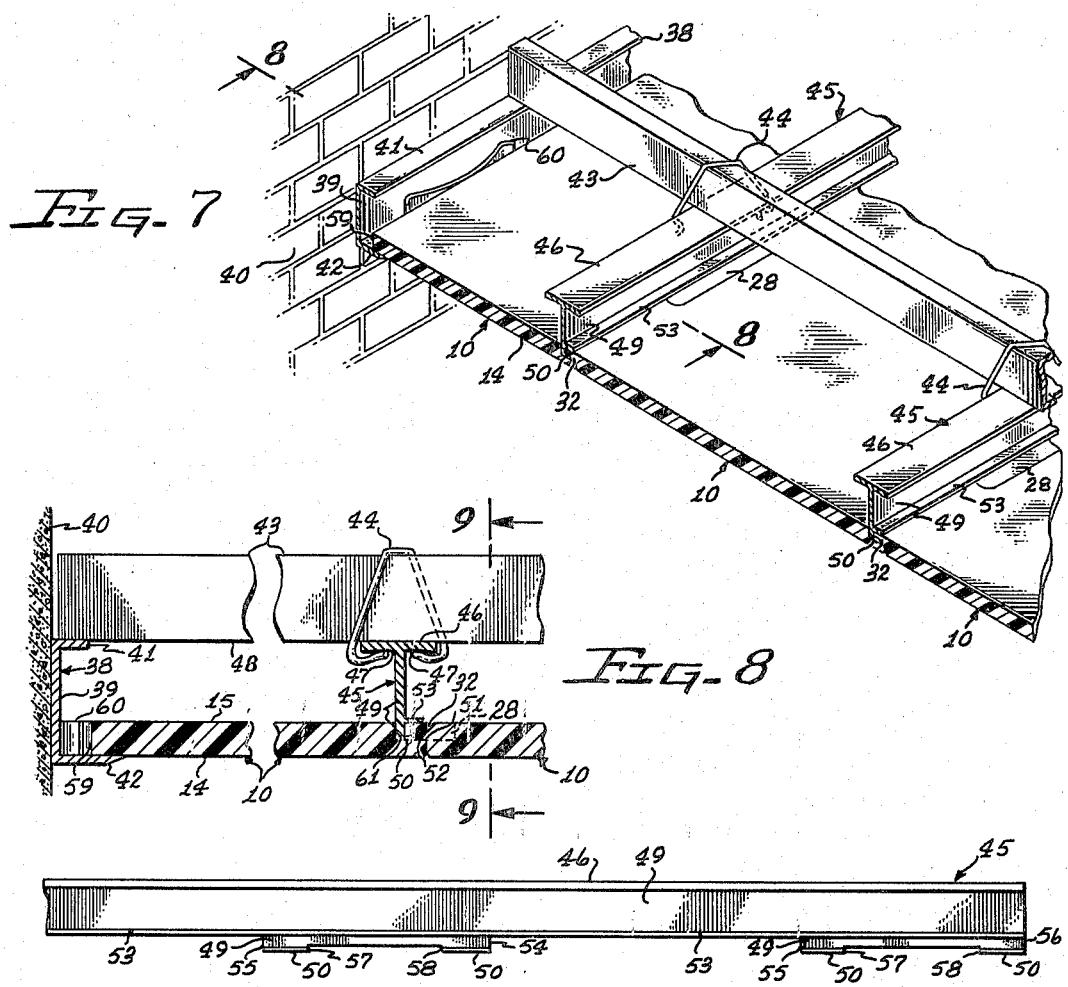
Fig. 7
Fig. 8
Fig. 9
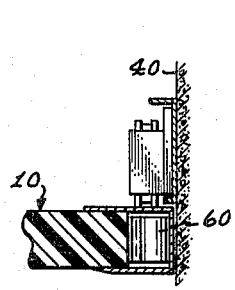
Fig. 10
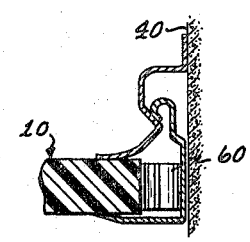
Fig. 11
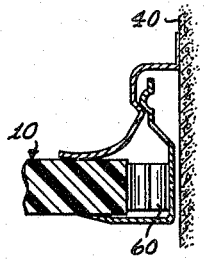
Fig. 12
INVENTOR.
JOHN H. MOSS
BY
ATTORNEY

United States Patent Office 3,290,848
Patented Dec. 13, 1966

3,290,848
CEILING AND WALL TILE AND SUSPENSION SYSTEM FOR SAME
John H. Moss, Phoenix, Ariz., assignor to The O'Malley Lumber Company, Phoenix, Ariz., a corporation of Arizona
Filed Feb. 26, 1964, Ser. No. 347,420
1 Claim. (Cl. 52—497)

This invention pertains to improvements in ceiling and wall tile and a suspension system for installing the same.

One of the objects of this invention is to provide a unique ceiling and wall tile of light weight and low cost that may be economically applied to a building structure.

Another object of this invention is to provide a ceiling and wall tile having a unique interlocking system which makes the application of the tiles as simple as possible as applied with adhesive, staples or on a suspension system.

It is still another object to provide a unique suspension system for securing the aforementioned tiles to a building structure.

And another object is to provide a suspension system for mounting the tiles in a demountable and removable manner so as to provide access to wiring piping and other utilities behind the tiles in a building structure.

Further features and advantages of this invention will appear from a detailed description of the drawings in which:

FIG. 1 is a front view of a tile incorporating the features of this invention.

FIG. 2 is a left hand side view of the tile shown in FIG. 1.

FIG. 3 is a right hand side view of the tile shown in FIG. 1.

FIG. 4 is an end view of the tile shown in FIG. 1.

FIG. 5 is a back view of the tile shown in FIG. 1.

FIG. 6 is an enlarged sectional view on the line 6—6 of FIG. 1.

FIG. 7 is a fragmentary isometric view of a suspension system for the tile incorporating the features of this invention.

FIG. 8 is an enlarged fragmentary view of the apparatus shown in FIG. 7.

FIG. 9 is a side elevation of the double-J bar support.

FIG. 10 is an enlarged fragmentary sectional view of a magnetic edge moulding apparatus.

FIG. 11 is an enlarged fragmentary sectional view of one form of friction type clip on edge moulding.

FIG. 12 is an enlarged fragmentary sectional view of another form of friction type clip on edge moulding.

As an example of one embodiment of this invention, there is shown a ceiling and wall tile 10 comprising a pair of square plate elements 11 and 12 integrally joined together at the line 13 and having a front surface 14, a rear surface 15, end edges 16 and 17 and side edges 18 and 19. Adjacent the end edge 16 is the tongue 20 and the groove 21 having a lateral depth 22 equal to the lateral outward projection 23 of the tongue relative to the end edge 16. The tongue 20 and groove 21 meet at 24 in a transverse line substantially intermediate the ends of the end edge 16 defined by the side edges 18 and 19. In a similar manner the tongue 25 and groove 26 are arranged on the end edge 17.

Along the side edges 18 the tongues 27 and 28 and grooves 29 and 30 are similarly arranged relative to the end edges 16 and 17 and the junction line 13. Similarly, the tongues 31 and 32 and grooves 33 and 34 are arranged along the side edges 19 relative to the end edges 16 and 17 and the junction line 13. Appropriate stiffening ribs 35 and weight and material reducing cavities 36 are provided in the tongue and groove element 37 on the rear surface 15 of the tile 10. By the above described arrangement, the tiles are fully interlocking when end 16 of one tile 10 is butted against an end edge 17 of another tile; when side edge 18 of one tile 10 is butted against a side edge 19 of another tile; or when end edges 16 and 17 of tiles are butted against side edges 18 and 19 of other tiles; so that exact alignment of the front surfaces 14 and rear surfaces for all tiles when assembled on the ceiling or wall, is accurately maintained. It is to be noted that the tiles 10 can be made up of single plate elements such as 11 or 12; of two integral panels as in the example shown; or any number and combination of plate elements 11 and 12 as desired, the above described functioning of the tongue and grooves prevailing in every case.

In the arrangement shown in FIGS. 7 to 12 there is shown a suspension system cooperating with the above described tiles to facilitate the installation of the same in a building structure. To this end there is provided a border trim piece 38 having a vertically disposed web 39 securely fixed to the buliding wall 40 and having an upper flange 41 and a lower extended flange 42. Carrying channels 43 are appropriately supported on top of the flange 41 of the border trim piece 38.

Suspended from the carrying channels 43 by suitable clips 44 are specially constructed double-J tile support bars 45 comprising a top flange 46, preferably recessed at 47 which is secured to the underside 48 of the carrying channel 43 and has an integral vertically disposed depending web 49. Formed integral with the lower edge of the web 49 and extending at right angles to the web 49 is a lower flange 50 adapted to engage between the surface 51 of a groove and the surface 52 of a tongue, FIG. 8 of two abutting tiles when assembled, this web flange 50 being presented at longitudinally spaced positions along the double-J bar as shown in FIG. 9.

Spaced above the web flange 50 of the double-J bar a distance equal to the thickness of a tongue is the intermediate flange 53. The portion of the web 49 between the flanges 50 and 53 and the points 54 and 55, FIG. 9, is completely cut away so as to receive a tongue 28 of a tile 10. Between the points 55 and 56 the flange 50 is present but may be removed between the points 57 and 58, the remaining flange pieces 50 being adapted to receive and support a tongue 32 of another tile 10.

Referring to FIG. 8, in assembling the left hand tile 10 between the first double-J bar 45 the edge 59 is cut off to suitable size and front surface 14 placed on top of lower extended flange 42 of the border trim piece 38 up against a flat compression spring 60 acting between the web 39 and the edge 59 to yieldingly normally urge the left hand tile to the right so as to hold its vertical edge 61 of the grooves while the tongues such as 28 project through the web 45 in the cutout areas 54–55, FIG. 9, to project beyond the outer edges of the flange 53 of the double-J bar 45. The right hand tile, FIG. 8, is then placed with its tongues entering the space between the flanges 50 and 53 with the tongues of the left hand tile previously placed being received in the grooves of the next placed tile to positively interlock the two tiles to the double-J bar 45. Sufficient clearance is provided between points 54 and 55 of the web 49, FIG. 9, to allow similar edgewise engagement of the tiles as described.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention what is claimed and desired to be obtained by United States Letters patent is:

A suspension system for a ceiling and wall tile having in combination:
 (a) a square tile element,
 (b) a front surface on said tile element,
 (c) a rear surface on said tile element,
 (d) end edges on said tile element,
 (e) side edges on said tile element,
 (f) a longitudinally spaced tongue and groove associated with each of said edges wherein said groove has a lateral depth equal to the lateral outward projection of said tongue relative to each of said edges,
 (g) and stiffening ribs and weight and material reducing cavities formed in the rear surface of said tile
 (h) whereby a plurality of said tiles may be placed in abutting engagement of said edges of said tiles to form an interlocked tile assembly,
 (i) said suspension system including a double-J bar secured to the building structure characterized by,
 (j) a top flange to secure the double-J support bar to the building structure,
 (k) an integral vertically disposed depending web,
 (l) a lower flange formed on the lower edge of said web and extending at right angles to said web and adapted to engage between the tongue and groove of adjacent abutting tile elements and located at longitudinally spaced positions along said double-J bar,
 (m) an intermediate flange formed on and projecting at right angles from said web at a distance above said lower flange equal to the thickness of said tongues,
 (n) and alternate cut-away portions in said web and lower flange between below said intermediate flange so as to provide interlocking tongue and groove engagement between abutting tile members located each side of said double-J support bar.

References Cited by the Examiner

UNITED STATES PATENTS 2,335,303  11/1943  Olsen _____ 52—485
2,689,630   9/1954  Drury _____ 52—485

FOREIGN PATENTS 341,294  11/1959  Switzerland.
372,816  12/1963  Switzerland.

REINALDO P. MACHADO, *Primary Examiner.*